Figure 1:
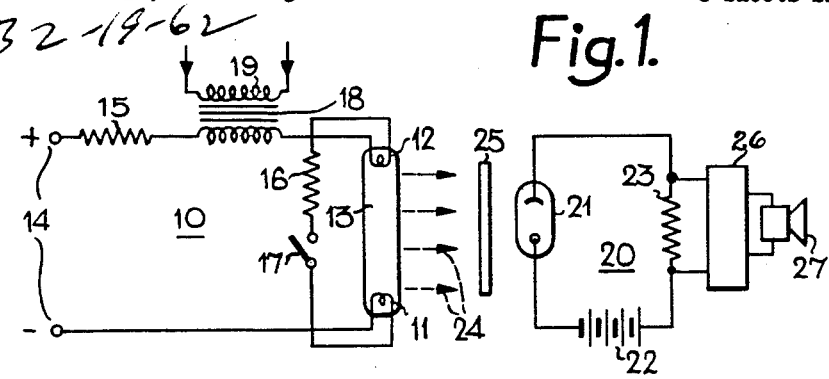

July 13, 1965     H. R. RUFF ETAL     3,194,965
VISUAL SIGNALLING SYSTEMS UTILISING MODULATED LIGHT
Filed Feb. 19, 1963     3 Sheets-Sheet 1

United States Patent Office 3,194,965
Patented July 13, 1965

3,194,965
VISUAL SIGNALLING SYSTEMS UTILISING MODULATED LIGHT
Harold R. Ruff, George K. Lambert, and Frederick E. Large, Leicester, England, assignors to Associated Electrical Industries Limited, London, England, a British company
Filed Feb. 19, 1963, Ser. No. 259,754
Claims priority, application Great Britain, Feb. 19, 1962, 6,353/62, 6,354/62
8 Claims. (Cl. 250—199)

This invention relates to sginalling systems in which intelligence is communicated by modulated light utilising a pre-arranged code, e.g., Morse code. The invention is particularly concerned with signalling systems of this character in which a beam of light is modulated by being varied between maximum and minimum values in the form of flashes of light.

The invention is concerned both with a signalling light source capable of producing a modulated beam of light visible over considerable distances, and with a system in which such a light beam is rendered visible to an observer in conditions in which the beam would normally be incapable of perception.

For many years it has been sought to provide a source of light capable of being modulated for signalling purposes and which is visible over a considerable distance throughout a solid angle which is limited in the vertical direction, but extends azimuthally through 360°. For a light from a source to be visible to an observer through a distance of the order of ten miles under conditions of darkness and under average atmospheric conditons, a high intensity source is not required. When, however, the source is required to be visible under daylight conditions, the apparent brightness of the source is so much diminished as a result of the brightness of the surroundings that a source of the order of 1,000,000 candle power would be required. No such source, is, however, at present really practicable where weight and power have to be considered.

One of the objects of the present invention is to provide a signalling light source which, by virtue of its monochromatism, can be rendered visible and for a long distance in adverse conditions.

Signalling systems are known in which light from a source is modulated in accordance with the intelligence to be transmitted, and the modulated light beam emitted from the source is received by a photo-electric cell, the variations in current output through which are utilised to actuate a sound reproducing device by which the intelligence transmitted is rendered audible. Such systems are also capable of operating with a source of light of relatively low value in conditions of darkness, since the signal-to-noise ratio is then at a maximum. Difficulties again arise in such systems when it is sought to use them under daylight conditions, since the photo-electric cell is largely incapable of distinguishing the variations in the intensity of the beam of light transmitting the desired intelligence from spontaneous variations of light emitted from the surroundings which cannot be entirely excluded from the cell, even if optical systems capable of forming the light from the source into a narrow beam and one concentrating the beam light on to the photo-cell are employed. Furthermore, the cell may be overloaded by the total light received.

While signalling systems embodying a source of light producing infra-red radiation in conjunction with a photocell preferentially responsive to infra-red radiation have been utilised to provide for invisible signalling during the hours of darkness, such systems may possess an inherently low signal-to-noise ratio when used in conditions of daylight.

A further object of the invention is accordingly to provide a signalling system which has an inherently high signal-to-noise ratio.

According to one aspect of the invention, a signalling system comprises a light source consisting of at least one sodium vapour electric discharge lamp, the radiation from which is concentrated by a suitable reflector or refractor to a limited solid angle, means for varying the power input to the light source so that modulation of the radiation from the light source is effected and signals are produced, and filter means interposed in the path between the light source and a detector of the radiation, the filter means being located in the vicinity of the detector. In order to maintain the ability of the sodium vapour lamp to produce a discharge during intervals when the power input to the lamp is either interrupted or modulated to a low value to produce the signals, heating means is associated with the lamp in order to maintain substantially constant the sodium vapour pressure therein, the power input to the heating means being increased when the power input to the lamp is diminished.

When the means for detection of the signals provided by the modulated radiation from the source is constituted by the eye of an observer, the filter means may be provided in an optical viewing device, such as goggles, a telescope or a pair of binoculars utilised by the observer for the purpose of reading the signals. When the signals are detected by a photo-electric cell responsive to the radiation and constituting the detector, the filter means will be located in front of the photo-electric cell.

In view of the substantially monochromatic radiation emitted by a sodium vapour lamp, the filter through which the radiation is viewed or detected should have a transmission factor selective to the sodium vapour resonance radiation from the lamp. By using such a filter, the apparent contrast between the radiation from the lamp and its surroundings increased to a viewer observing the lamp through the filter, and the lamp becomes visible at a greater distance than is possible without the interposition of the filter. In effect the filter increases the apparent brightness of the lamp by absorbing or deflecting all the light transmitted through the atmosphere from the suroundings of the lamp, except those radiations which are capable of being transmitted through the filter, i.e. those corresponding with the sodium vapour radiation. Since such radiations are normally present in the atmosphere to an extent of approximately 3% of the total visible light, the apparent brightness of the lamp is increased by a factor of twenty or more times. The signalling source accordingly embodies a source of light possessing an effectiveness equal to that given by a source having a power consumption of approximately twenty times that of the source actually employed. Similar conditions of improved signal-to-noise ratio obtain when the radiation is detected by a photo-electric cell in front of which the filter is located.

Particularly when such a signalling system is employed for marine purposes, it is important for the source to be visible in all azimuthal directions from the position at which it is located, usually on the masthead of a ship. For this purpose, it is usually necessary to employ a plurality of sodium vapour electric discharge lamps, each having reflecting or refracting means associated therewith, in order to confine the radiation to a limited solid angle.

Thus, in accordance with a further aspect of the invention, a light source comprises a plurality of tubular sodium vapour electric discharge lamps arranged in chordal relation with their longitudinal axes located in a common plane which intersects, and preferably bisects, the limited solid angle into which the radiation from the individual lamps is concentrated.

In order to render such a source visible azimuthally over 360° a minimum of three lamps and associated reflectors or refractors are required, the lamps and reflectors or refractors being arranged so that their planes of symmetry are coincident. The lamps and their associated light control devices are accordingly arranged to form a triangle or regular polygon with the radiation directed radially outwardly from the axis of symmetry normal to the common plane containing the longitudinal axes of the lamps.

When using such a light source for signalling, it will be usual to modulate the light from all the lamps simultaneously, although for some purposes one or more of the lamps can be modulated so that the signals can be used to cover a limited azimuth angle when required.

The sodium vapour lamp which we prefer to employ is a linear sodium vapour lamp having thermionic electrodes located at both ends of a vitreous tube containing sodium which is vaporised during operation and a small percentage of a starting gas, the tube being mainly of non-circular cross-section and shaped to provide longitudinally extending recesses remotely located from the arc path for the retention by capillary attraction of molten metal, the recesses being located in successive longitudinal regions of the tube to lie on opposite sides of the axis of the arc path.

In order that the nature of the invention may be more readily understood and carried into effect, reference will now be directed to the following description of the accompanying drawings, which illustrate several embodiments of the same.

Figure 2:
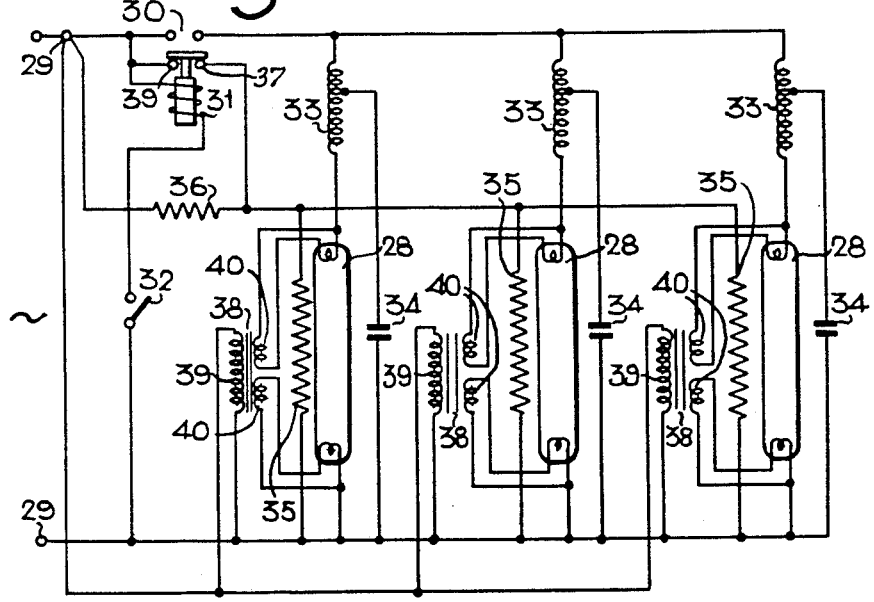
Figure 3:
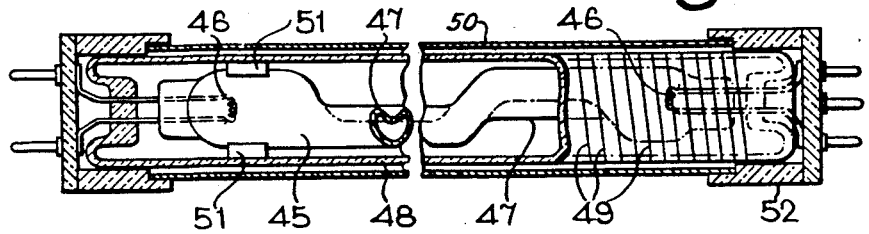
Figure 4:
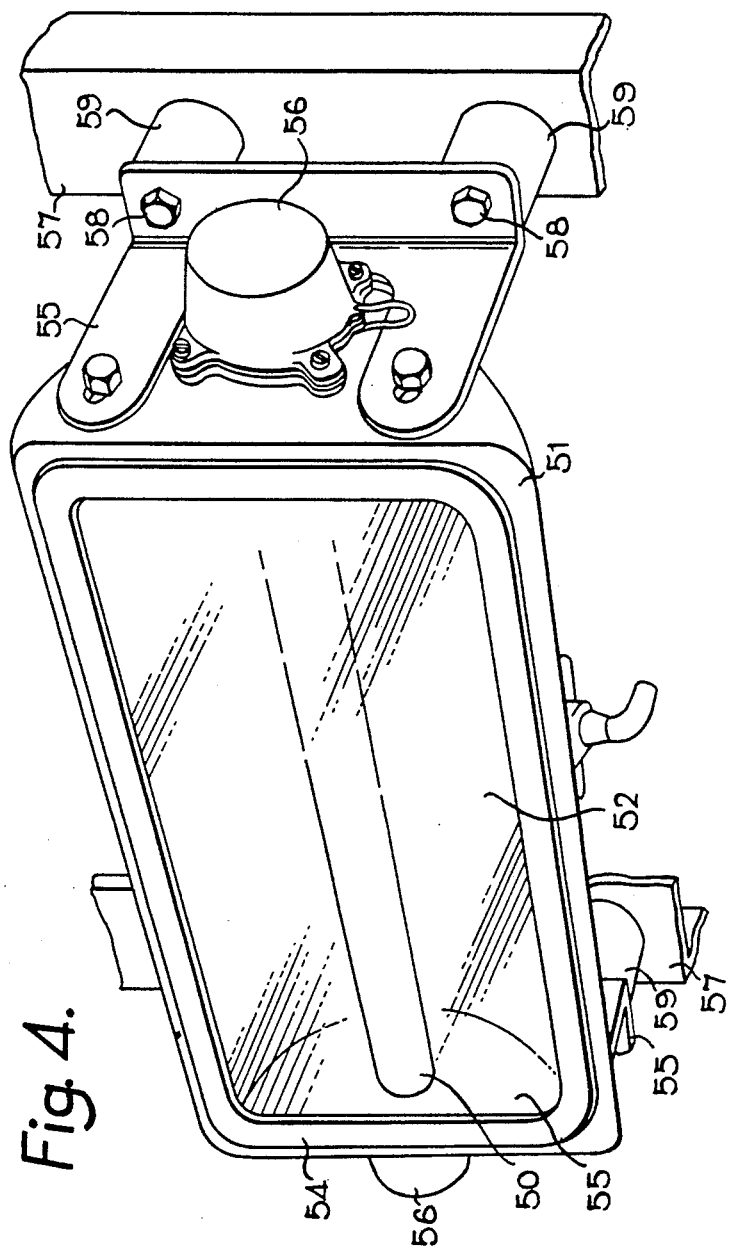
Figure 5:
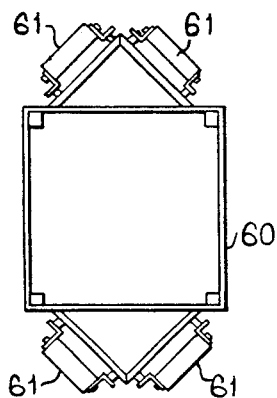
Figure 6:
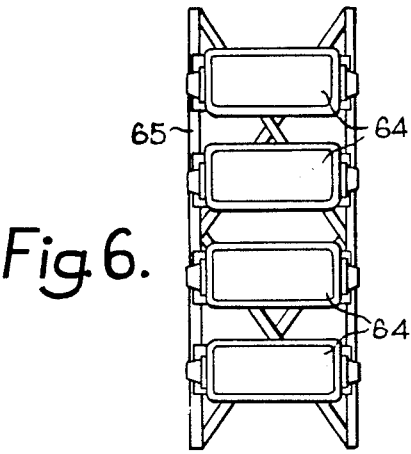
Figure 7:
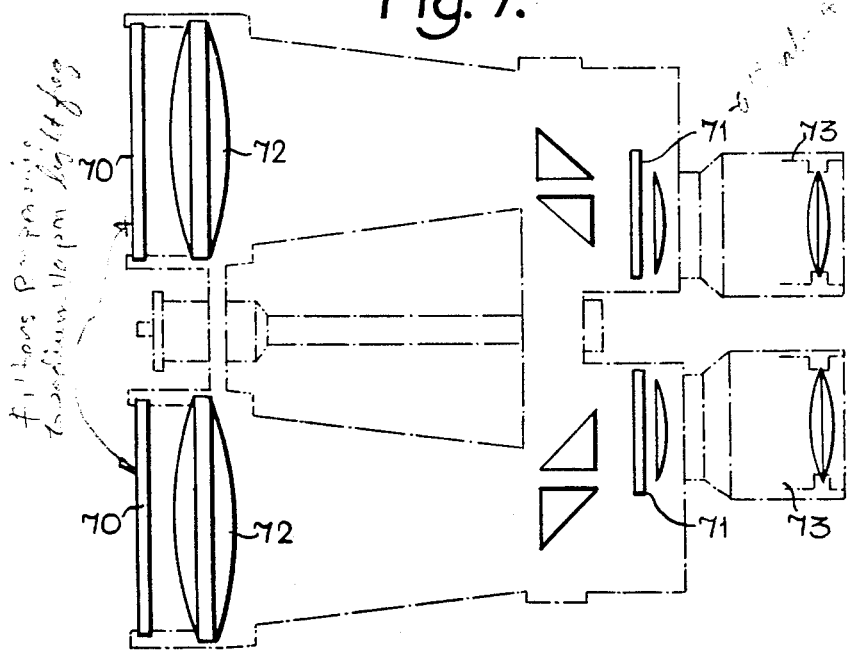

In the drawings:

FIG. 1 indicates diagrammatically the signalling system embodying a sodium vapour electric discharge lamp, the light from which is received by a photo-electric cell through a filter passing only the monochromatic radiation from the lamp, FIG. 2 is a diagram showing an alternative method in which the radiation from a source constituted of a plurality of sodium vapour electric discharge lamps may be modulated for signalling purposes, FIG. 3 is a representation of a linear sodium vapour electric discharge lamp such as may be utilised in the signalling system of the invention, FIG. 4 is a perspective view of a lamp and housing suitable for embodying in a signalling system particularly for marine purposes, FIG. 5 is a plan view showing the manner in which a plurality of lamp housings may be mounted on a masthead of a ship to give wide azimuthal angle of view, FIG. 6 illustrates the manner in which a battery of lamp housings may be mounted in a vertical plane, each battery of such lamps being represented in plan view by one of the lamps indicated in FIG. 5, and FIG. 7 illustrates the manner in which the filters for the monochromatic radiation from the sodium vapour lamps can be embodied into an optical viewing device.

Referring firstly to FIG. 1, this represents a signalling circuit 10 having a source of radiation constituted by a linear sodium vapour electric discharge lamp having thermionic electrodes 11, 12, mounted on opposite ends of a tubular envelope 13. The envelope 13 contains a suitable quantity of metallic sodium, together with a low pressure, e.g. 11 mms. of a rare gas to enable a discharge to be started between the electrodes 11, 12, in a manner well-known in connection with such lamps. The lamp is shown as being energised from a source of direct current electric power 14 having positive and negative terminals indicated. The electrodes 11 and 12 are connected to the source 14 in a series circuit with a stabilising resistor 15, a current limiting resistor 16 and a starting switch 17. Included also in this circuit is a secondary winding of a modulating transformer 18 to the primary winding 19 of which are applied A.C. signals for the purpose of modulating the power input to the lamp. The signalling circuit so far described is associated with a remotely positioned receiving circuit 20 shown as comprising a photo-electric cell 21 energised from a source of supply, indicated as a battery 22, through a load resistor 23 across which are developed voltage variations corresponding with the variations in current through the cell 21 produced by the modulated radiation originating with the sodium vapour discharge lamp in the signalling circuit 10. The voltage variations at the terminals of the load resistor 23 are led to a suitable A.C. amplifier 26, as indicated. The modulated radiation indicated by the arrows 24 from the signalling source are received by the photo-electric cell 21 after passage through a filter 25 having a transmission factor selective to the sodium vapour radiation from the source. The filter 25 may be in the form of an interference filter or combined interference/absorption sealed unit. A Barr and Stroud narrow band (all dielectric) filter with a peak transmission at the sodium D line is suitable.

In operation, the discharge through the lamp in the signalling circuit 10 is started by momentarily closing the starting switch 17, and after the lamp has been allowed to warm up and the discharge through the sodium vapour has become stabilised, signalling may then commence by applying A.C. signals through the modulating transformer 18 whereby the monochromatic radiation from the source is modulated to constitute signals receivable by the photo-electric cell 21 through the filter 25. Voltages corresponding to the signals transmitted appear across the load resistor 23 and are passed to the amplifier 26 for amplification prior to their being rendered audible in a receiving device 27; the receiver 27 may be an earphone, or a loud-speaker, according to the requirements of the system.

The voltage of the D.C. source 14 of electric supply may be of the order of 250 volts, where the discharge lamp is of the order of 36 inches in length. In this case, the stabilising resistor 15 may have a value of 60 ohms, the limiting resistor 16 a value of 80 ohms, and the inductance of the modulating transformer 18 a value of 0.2 henry. In the receiving circuit, depending on the characteristics of the photo-electric cell 21, the battery 22 may have a voltage of 120 volts, while the load resistor 23 has an impedance of 1 megohm.

The signalling arrangement illustrated in FIG. 1 may be modified to provide for the modulation of the radiation from the source to be effected by interrupting the supply to the lamp constituting the light source, rather than by varying the input to the lamp, as indicated in FIG. 1. This modification is illustrated in the FIG. 2 arrangement, which applies only to the signalling circuit. FIG. 2 further indicates a modification in which the light source is constituted by a plurality of sodium vapour electric discharge lamps supplied in parallel from a source of electric power. The arrangement shown in FIG. 2 is also directed to a system in which the source of electric power is of an alternating character, which may be of mains or higher frequencies, instead of a direct current as indicated in FIG. 1. In the FIG. 2 arrangement, the source is constituted by a plurality of electric discharge lamps 28, of which three are shown. The lamps are connected in parallel to an alternating source of supply, indicated by the terminals 29. The terminals 29 of the source of supply are connected to the paralleled lamps 28 through the normally open contacts 30 of a contactor 31, the operating winding of which is connected across the terminals 29 through a signalling key 32. In series with each lamp is an inductance 33 which serves in a well-known manner to stabilise the discharge through the lamp. Connected in parallel with the lamp 28 and a portion of the inductance 33, is a capacitor 34, the function of which is to produce surge voltages across the lamp when signals are being transmitted by operation of the key 32. The contactor 31 is also provided with back contacts 37 which are closed when the contactor is open and when open serve to introduce in series with heating resistors 35 for each lamp a further resistor 36, hereinafter referred to.

In the arrangement illustrated in FIG. 2, it will be noted that when the contacts 30 of the contactor 31 are opened by de-energisation of the operating winding through the opening of the key 32, current through the lamps is interrupted. In order to ensure full light output on re-starting the discharge through the lamps, means is provided for maintaining substantially constant the pressure of sodium vapour present in the lamps when current flow therethrough is interrupted. The means for maintaining a constant pressure of sodium vapour in the lamp envelope is indicated as being in the form of heating means shown as the heating resistor 35 surrounding the envelope of the lamp. The heating resistors 35 are connected in parallel and through the common ohmic resistor 36 to the supply terminal 29. It is arranged that when the contacts 30 of the contactor 31 open, contacts 37 close and short-circuit ohmic resistor 36. Thus the back contacts 37 are arranged to connect the resistors 35 directly to the supply terminal 29 when contactor 31 is de-energised.

As a further means of ensuring the initiation of a discharge through the lamp when the normally open contacts 30 are closed, the electrodes corresponding to those 11, 12 of the lamp indicated in FIG. 1 are arranged to be heated by transformers 38 having primary windings 39 connected directly to the supply 29 and individual secondary windings 40 connected to the electrodes of the lamp. The electrodes are thus continuously heated whilst the supply is available for signalling purposes, in order to maintain the electrodes in an electron-emitting condition and assist the immediate production of a discharge through the lamps when the signalling key 32 is closed to provide for the emission of radiation from the lamps.

The operation of FIG. 2 proceeds as follows: When a source of supply which may be of the order of 440 volts is connected to the terminals 29, the normally open contacts 30 being assumed to be open, the heating resistors 35 are supplied with heating current from the source through the circuit including the back contacts 37 of the contactor 31; the lamp envelopes are thereby heated and the sodium contained in the envelope vaporised and brought to a condition in which a sodium vapour discharge can readily be produced through the lamps. Simultaneously, the electrodes of each lamp are heated by the passage of current through the transformers 38 from the supply.

When the key 32 is closed contactor 31 is energised and its normal open contacts 30 are closed, thus supplying operating current to all the lamps 28 in parallel. Simultaneously, with the closure of contacts 30, back contacts 37 open, putting the series resistor 36 in circuit with the heating resistors 35 and diminishing the heat supplied to the lamp envelopes. On the closure of the supply to the lamps, current flows through the inductances 33 and, owing to the presence of the shunt capacitor 34, a surge is produced in the lamp circuit which causes the discharge through the lamps to be produced. The lamps therefore radiate their beam of monochromatic radiation which is receivable by the distant detector. Conversely, when the contacts 30 of the contactor 31 are opened, on the release of the key 32 back contacts 37 are closed to short-circuit the series resistor 36 and increase the current through the heating resistors 35 to maintain the pressure of sodium vapour within the lamp envelope. For the case in which the lamps are of an order of 36 inches long with a normal load of 200 watts, the value of the series resistor 36 may be 10 ohms, of the heating resistors 35 340 ohms, and the capacitors 34 may have a value of 0.25 mfd.

FIG. 3 illustrates a form of linear sodium vapour electric discharge lamp which may be used in the equipment so far described. The lamp consists of an arc tube 45 some 29 inches long by 1 inch diameter with a thermionic electrode 46 sealed in at each end. A series of deep, boat-shaped depressions 47 are formed from alternate sides along the lamp, the depressions providing longitudinally extending recesses located in successive longitudinal regions of the arc tube to lie on opposite sides of the arc path. These depressions perform a complex function which results in better electrical characteristics, higher lamp conversion efficiency and stable distribution of excess sodium by combined temperature control of evaporation and condensation and retention by capillary attraction of the molten sodium in the recesses.

In operation the interior of the arc tube must be maintained at about 300° C. to produce a sodium vapour pressure giving optimum light output; consequently, as the power input to the lamp is reduced heat must be supplied externally to compensate for such loss of heat. The arc tube is therefore surrounded by an inner tube 48 carrying a heating element in the form of a spiral of bright resistance wire 49. Tube 48 has a diameter intermediate between that of the arc tube 45 and the outer glass envelope 50. It has been found that it is necessary to supply some 360 watts of electric power to the heating element in the standby condition when the lamp is not emitting light.

The arc tube 45 is supported in the glass cylinder on which the heating wire is wound by mica pads 51, while the latter is mounted in the smooth outer glass cylinder by an end cap assembly 52 of Mycalex or similar material.

The termionic electrode connections and the ends of the resistance winding of the lamp oven are connected to the pins on the end cap assembly. The arc tube is closed at each end with a suitable stem or foot by processes well-known in the lamp making industry. Through each stem or foot pass suitable current carrying lead wires which are connected at their outside ends to the lead wires passing through the outer container. Molten sodium metal and the required charge of chemically inert rare gas, such as neon and/or argon and xenon, can be admitted to the arc tube through the exhaust tube which is then sealed off during manufacture.

The two lead wires passing through each foot or stem of the arc tube, hold a cathode and anode electrode system capable of supporting the arc discharge within the arc tube throughout the useful life of the lamp.

The outer container and the heat shield are tubular in form, while the arc tube has its cross-sectional configuration altered from round to a more useful shape during manufacture, conveniently by distorting the wall from an initial circular cross-section to the crescent shape, whilst the tube is heated to a plastic condition. Longitudinally extending recesses are thus provided for the retention of metallic sodium.

FIG. 4 represents a form of lantern which may be employed as a light source in the system so far described. The sodium vapour discharge lamp 50 is mounted in a housing 51 being in cross-section of generally parabolic form and including a trough shaped reflector 52 also of substantially parabolic form at the focus of which the axis of the lamp 50 is located. The front of the housing is closed by a transparent window 53 which may be of perspex, or similar acrylic resin, which is sealed to the housing with a weather-proof gasket 54. The housing is provided with a bracket at each end, of which 55 is indicated. The end of the lamp, accessible through an opening in the end wall of the housing, being closed by an end cap 56. The bracket 55 is L-shape in construction, which enables the housing to be mounted on a vertical support, indicated as being in the form of an L beam 57, to which it is connected by bolts 58, there being vibration absorbing pads 59 secured between the flange and the support 57. Particularly when signalling for marine purposes is in question, whilst the reflector or refractor associated with the lamp operates to concentrate the substantially monochromatic radiation from the lamp to a limited solid angle, it may be desirable for the light source to be visible throughout a wide azimuthal angle. In this case it will be desirable to provide as the light source a plurality of lamps with their associated reflectors and/or refractors such as the lantern illustrated in FIG. 4, and to arrange the lantern so that the longitudinal axes of the lamps are located in a common plane which intersects and preferably bisects the solid angle through which the radiation from the lamps is concentrated by their associated reflectors and/or refractors. In this case the plurality of linear sodium vapour discharge lamps are arranged in chordal relation with their longitudinal axes located in the common plane which substantially bisects the solid angle in which the radiation from the individual lamps is concentrated.

FIG. 5 illustrates in plan view an arrangement in which this chordal arrangement of discharge lamps in their enclosed housings may be arranged on the masthead of a ship.

In FIG. 5 the mast 60 is indicated as being of lattice construction and to have a plurality of lamps in their enclosing housings, four are indicated, mounted in pairs on oposite sides of the mast, as indicated at 61. The housings will be so located that the longitudinal axes of the lamps lie in a common plane which substantially bisects the angle in which the radiation from the lamps is concentrated. Two other pairs of lamps could be mounted on the remaining faces of the mast if desired. In this way the radiation from the source becomes visible over a wide range of azimuthal angles.

FIG. 6 shows an arrangement looking at the mast from the side, in which each of the lanterns, indicated at 61, (FIG. 5), is composed not of a single lantern, but of a vertical battery of lanterns 64 located on a common frame 65, the frame being arranged for securing to the mast 60 in any convenient manner. In an arrangement such as that indicated in FIG. 6, each of the lamps 64 in the battery is located so that its longitudinal axis lies in a common normal horizontal plane containing the axes of the corresponding lamps in the batteries on other positions on the mast. The housings will be positioned so that the solid angle to which the radiation from each lamp is concentrated by the reflector and/or refractor in the housing is intersected, preferably bisected, by the common plane containing the axes of the corresponding lamps in the other batteries.

In FIG. 7 we have shown diagrammatically an arrangement in which filters 70 or 71 may be embodied into an optical viewing device, indicated schematically as being in the form of a pair of binoculars, so that the signals emitted by the modulation of the light source on a distant ship can be seen by an observer. It will be noted that the filters 70 are located in front of the respective object glasses 72 of the binoculars, while the alternative filters 71 are interposed in the path of the rays passing through the object lens 72 to the respective eye pieces 73. Since the binoculars schematically illustrated are well-known in the art, no additional description of them appears to be necessary. The filters 70 and 71 will be of a kind suitable for transmitting substantially only the monochromatic radiation from the sodium vapour discharge lamps embodied in the light source. Location of the filters at position 71 is preferred as this position, although restricted, provides greater protection against damage.

It will be understood that in the aforegoing specification we have sought to describe various arrangements in which the invention may be carried into effect, but we do not desire to be limited to such arrangements as described, but only to be limited by the scope of the appended claims.

What we claim is:

1. A signalling system comprising a light source consisting of at least one sodium vapour electric discharge lamp, means for concentrating the substantially monochromatic radiation from said light source to a limited solid angle, a source of electrical power connectible to said light source to cause said source to emit said radiation, electrical heating means for said light source, means for varying the power input to said light source from said source of electrical power and thereby modulating said monochromatic radiation from said light source to produce signals, means for controlling the power input to said heating means from said source of electrical power whereby to maintain substantially constant the sodium vapour pressure in said light source when the power input to said light source is varied, and filter means adapted to pass substantially only said modulated monochromatic radiation constituting said signals, said filter means being interposed in the path between said light source and a detector of said monochromatic radiation in the vicinity of said detector.

2. A signalling system as claimed in claim 1, in which said filter means is incorporated into an optical viewing device for said light source.

3. A signalling system as claimed in claim 1 in combination with a photo-electric cell responsive to said monochromatic radiation and constituting said detector, and means for converting the resulting output from said cell into audible signals, said filter means being located in front of said photo-electric cell.

4. A signalling system comprising a light source, said light source consisting of a plurality of linear sodium vapour electric discharge lamps arranged in chordal relation with their longitudinal axes located in a common plane, individual means associated with each of said lamps for concentrating the radiation from said light source to a limited solid angle, intersected by said common plane, a source of electrical power connectible to said light source to cause said source to emit said radiation, electrical heating means for each of said lamps in said light source, means for varying the power input to said light source from said source of electrical power and thereby modulating said monochromatic radiation from said light source to produce signals, means for controlling the power input to each of said heating means from said source of electrical power whereby to maintain substantially constant the sodium vapour pressure in each of said lamps when the power input to said light source is varied, and filter means adapted to pass only said modulated monochromatic radiation constituting said signals, said filter means being interposed in the path between said light source and a detector of said monochromatic radiation in the vicinity of said detector.

5. A signalling system as claimed in claim 4, in which said filter means is incorporated into an optical viewing device for said light source.

6. A signalling system as claimed in claim 4, in combination with a photo-electric cell responsive to said monochromatic radiation and constituting said detector, and means for converting the resulting output from said cell into audible signals, said filter means being located in front of said photo-electric cell.

7. In a signalling system, a light source comprising a plurality of linear sodium vapour electric discharge lamps, said lamps being arranged in chordal relation with their longitudinal axes located in a common plane, individual trough-shaped reflectors associated with each lamp to concentrate the substantially mono-chromatic radiation therefrom, when energised, to a limited solid angle intersected by said common plane, electrical heating means associated with each of said lamps, a source of electrical power for energising said lamps, means for simultaneously varying the power input to each of said lamps from said source, and means for maintaining substantially constant the pressure of sodium vapour in each of said lamps by the supply of electrical power from said source to said heating means whilst said power input is varied.

8. In a signalling system according to claim 7, switching means having normally-open contacts connected in circuit between said source of electrical power and said lamps and normally closed contacts connected in circuit between said source of electrical power and said heating means, a direct connection between said source of electrical power and said heating means, an ohmic resistance in said direct connection, and means for operating said switching means to close said normally-open contacts and open said normally closed contacts.

References Cited by the Examiner

UNITED STATES PATENTS 2,032,588  3/36  Miller _____ 250—199

DAVID G. REDINBAUGH, *Primary Examiner.*

KATHLEEN H. CLAFFY, *Examiner.*